United States Patent [19]
Berfield

[11] Patent Number: 5,372,158
[45] Date of Patent: Dec. 13, 1994

[54] VALVE WITH BACKFLOW PREVENTER

[75] Inventor: Robert C. Berfield, Jersey Shore, Pa.

[73] Assignee: Shop Vac Corporation, Williamsport, Pa.

[21] Appl. No.: 130,016

[22] Filed: Sep. 30, 1993

[51] Int. Cl.$^5$ .................................................. F16K 24/02
[52] U.S. Cl. .................................. 137/217; 251/310; 251/312
[58] Field of Search .................. 137/217, 218, 447; 251/310, 312

[56] References Cited

U.S. PATENT DOCUMENTS

| | | | |
|---|---|---|---|
| D. 181,038 | 9/1957 | Britton | D78/1 |
| D. 183,042 | 6/1958 | Fuglie | D91/3 |
| D. 285,478 | 9/1986 | Hengesbach | D23/19 |
| D. 288,229 | 2/1987 | Beal et al. | D23/43 |
| D. 299,520 | 1/1989 | Pechler | D23/245 |
| D. 318,903 | 8/1991 | Lenberg | D23/245 |
| D. 325,961 | 5/1992 | Hayes | D23/262 |
| 2,021,342 | 11/1935 | Wesson | 137/217 |
| 2,173,070 | 9/1939 | Brown | 137/217 |
| 2,261,886 | 12/1952 | Mueller | 251/95 |
| 2,631,002 | 3/1953 | Mueller | 251/103 |
| 2,715,910 | 8/1955 | Kass | 137/447 |
| 2,929,406 | 3/1960 | Anderson | 137/615 |
| 3,058,718 | 10/1962 | Johnson | 251/214 |
| 3,106,935 | 10/1963 | Gatzke | 137/218 |
| 3,424,184 | 1/1969 | Brimley et al. | 137/102 |
| 3,563,512 | 2/1971 | Hauffe | 251/312 |
| 3,770,016 | 11/1973 | Johnstone et al. | 137/625.22 |
| 3,815,871 | 6/1974 | Carlson | 251/310 |
| 3,889,923 | 6/1975 | Saville et al. | 251/312 X |
| 4,027,698 | 6/1977 | Weinhold | 137/625.22 |
| 4,287,905 | 9/1981 | Iglesias | 137/102 |
| 4,614,330 | 9/1986 | Kalsi et al. | 251/283 |
| 4,806,258 | 2/1989 | Duncan | 210/423 |
| 4,927,116 | 5/1990 | Schwarz et al. | 251/312 |
| 5,148,839 | 9/1992 | Kirwan et al. | 141/1 |

FOREIGN PATENT DOCUMENTS

| | | | |
|---|---|---|---|
| 634515 | 1/1962 | Canada | 137/218 |
| 2421722 | 6/1975 | Germany | 137/217 |
| 1602193 | 11/1981 | United Kingdom | 137/217 |

OTHER PUBLICATIONS

GF. product brochure illustrating five valves, two pages. An actual valve is believed to be sold by G.F. (no date).

*Primary Examiner*—Stephen M. Hepperle
*Attorney, Agent, or Firm*—Marshall, O'Toole, Gerstein, Murray & Borun

[57] ABSTRACT

A valve with a backflow preventer has a valve housing with a fluid inlet, a main flow channel, and a fluid outlet formed therein. A valve element is provided in the valve housing to selectively actuate the valve. The valve element is rotatable between an open position in which a fluid flow path exists between the fluid inlet and the fluid outlet along the main flow channel and a closed position in which no fluid flow path exists between the fluid inlet and the fluid outlet. A chamber is formed in the valve housing in a position which is offset from the main flow channel. The chamber has an opening in fluid communication with the atmosphere, and a ball is provided in the interior of the chamber. The ball is movable between a first position in which the ball prevents fluid backflow from the fluid outlet to the fluid inlet and a second position in which the ball substantially blocks the opening in the chamber.

20 Claims, 3 Drawing Sheets

VALVE WITH BACKFLOW PREVENTER

BACKGROUND OF THE INVENTION

The present invention is directed to a valve with a backflow preventer to prevent liquid backflow from the valve outlet to the valve inlet.

In some types of valves, it is desirable to provide means for preventing liquid backflow through the valve. One example of such a valve is one that is connected between a source of fresh water and a device for utilizing the water which may contaminate the water as it passes through the device. To prevent contamination of the source of fresh water due to backflow, a backflow preventer may be incorporated in the valve to prevent liquid from flowing from the valve outlet to the valve inlet.

One example of a valve with a backflow preventer is disclosed in U.S. Pat. No. 3,424,184 to Brimley, et al. That valve incorporates a backflow preventer in the form of a movable ball which may seat on a pair of spaced-apart O-rings provided in the main flow channel of the valve. In normal operation, the fluid pressure at the fluid inlet forces tile ball to seat on the O-ring closest to the fluid outlet. In that position, the ball allows fluid flow through the valve. To prevent fluid backflow through tile valve, the ball seats on the O-ring closest to the fluid inlet.

Another valve with a backflow preventer is disclosed in U.S. Pat. No. 4,287,905 to Iglesias. That valve, which is for a water faucet, incorporates a check valve to prevent water backflow. The check valve is provided in the form of a hinged flap disposed in the main flow channel. The flap is provided with a gasket that is positioned next to a fluid opening near the fluid inlet. To prevent fluid backflow through the valve, the hinged flap moves so that the gasket is forced against the fluid opening, thus sealing the opening.

One disadvantage of the valves disclosed in the Brimley, et al. and Iglesias patents is that the means for preventing fluid backflow is provided in the main flow channel of the valve, thus obstructing the fluid flow through the valve during normal operation.

SUMMARY OF THE INVENTION

The present invention is directed to a valve with a backflow preventer. The valve has a valve housing with a fluid inlet, a main flow channel, and a fluid outlet formed therein. A valve element is provided in the valve housing and is rotatable between an open position in which a fluid flow path exists between the fluid inlet and the fluid outlet along the main flow channel and a closed position in which no fluid flow path exists between the fluid inlet and the fluid outlet. The valve has a check valve for preventing fluid backflow from the fluid outlet to the fluid inlet when the pressure at the fluid inlet is less than atmospheric pressure. The check valve is provided at a position offset and separate from the main flow channel so that the check valve does not substantially impede the fluid flow through the main flow channel when the valve element is in the open position.

In one embodiment, the check valve may be provided in the form of a ball disposed in a chamber formed in the valve housing in a position offset from the main flow channel. The chamber has an opening in fluid communication with the atmosphere. As long as it is greater than atmospheric pressure, the fluid pressure at the fluid inlet forces the ball against the opening in the chamber, thus sealing the opening and preventing fluid from leaking from the valve. When the ball is in that position, it does not obstruct or impede the flow through the main flow channel. In the event that the pressure at the fluid inlet becomes less than atmospheric, the ball unseats from the opening in the chamber and is forced against a circular bore in fluid communication with the fluid inlet, thus preventing any substantial liquid backflow through the valve.

The features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
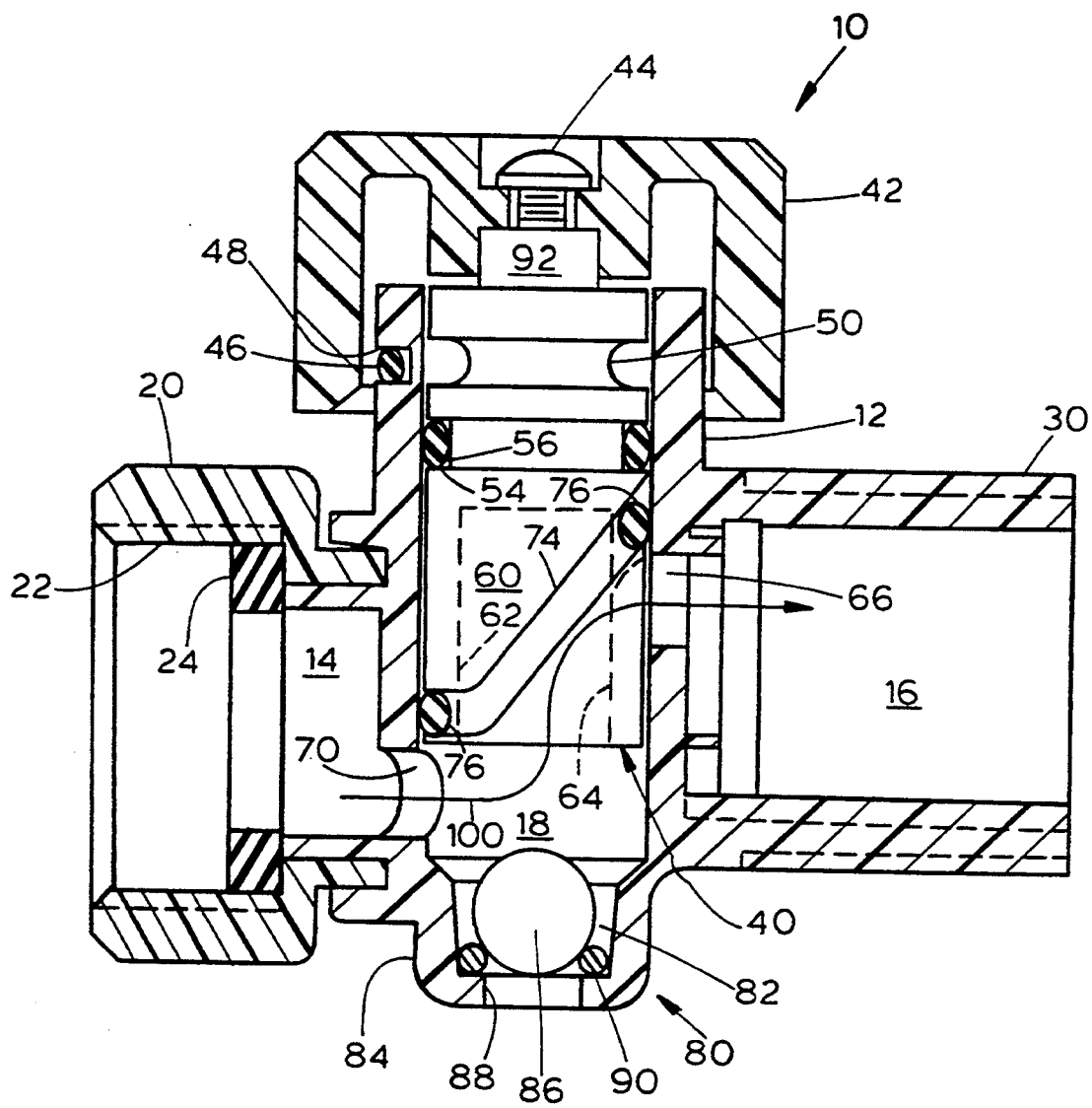
FIG. 1 is a cross-sectional view of a preferred embodiment of a valve in accordance with the invention.

A cross-section of a preferred embodiment of a valve 10 in accordance with the present invention is shown in FIG. 1. Referring to FIG. 1, the valve 10 has a valve housing 12 having a fluid flow inlet 14, a fluid flow outlet 16, and a main flow channel 18 formed therein. A female coupler 20 having an internally threaded portion 22 is connected to the valve housing 12 at the fluid inlet 14. A rubber washer 24 is provided within the coupler 20 to provide a fluid-tight seal when the coupler 20 is threaded onto a fluid supply source, such as a garden hose (not shown). The coupler 20 may have a plurality of knurls (not shown) formed about its periphery to aid in the attaching the coupler 20 to the fluid supply source. The exterior of the valve housing 12 adjacent the fluid outlet 16 has a threaded portion 30 to allow the valve 10 to be connected to a fluid-utilizing device, such as a pressure washer (not shown).

A valve element 40 is provided within the valve 10 to control the fluid flow through the valve 10. The valve element 40, which is generally cylindrical in shape, is rotatable between an open position in which fluid flows through the valve 10 and a closed position in which fluid flow through the valve 10 is blocked. Rotation of the valve element 40 is controlled by a manually operated valve actuator in the form of a knob 42. The knob 42, which is secured to the valve element 40 via a screw 44, may have a plurality of knurls (not shown) formed about its periphery to aid in turning it. The valve housing 12, the female coupler 20, the valve element 40, and the valve actuator 42 may be composed of plastic. The coupler 20 may be permanently attached to the valve housing 12 via any conventional method, such as spin welding.

The valve element 40 is rotatably fixed within the valve housing 12 via a U-shaped locking pin 46 provided in a U-shaped recess 48 (see also FIG. 2B) formed in the exterior of the valve housing 12. The two ends of the U-shaped locking pin 46 are disposed within an annular recess 50 formed in the valve element 40 to hold the recess 50 at the same elevation as the recess 48, and thus to hold the valve element 40 at a fixed elevation within the valve housing 12. An O-ring 54 is provided within an annular recess 56 formed in the valve element 40 below the recess 50. The O-ring 54 prevents any fluid from leaking out of the upper portion of the valve 10.

Figure 3A:
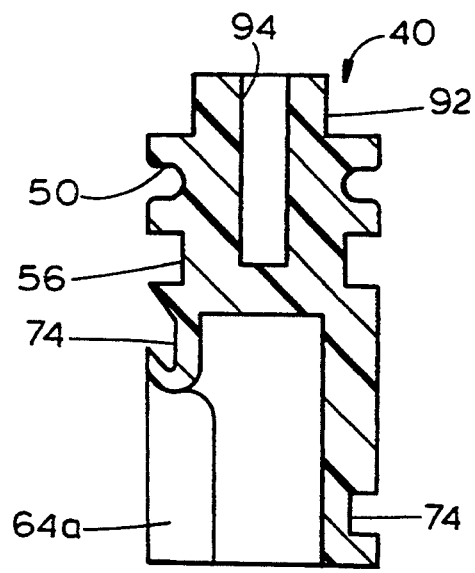
FIG. 3A is a cross-sectional view of the valve element of the valve shown in FIG. 1.
Figure 3B:
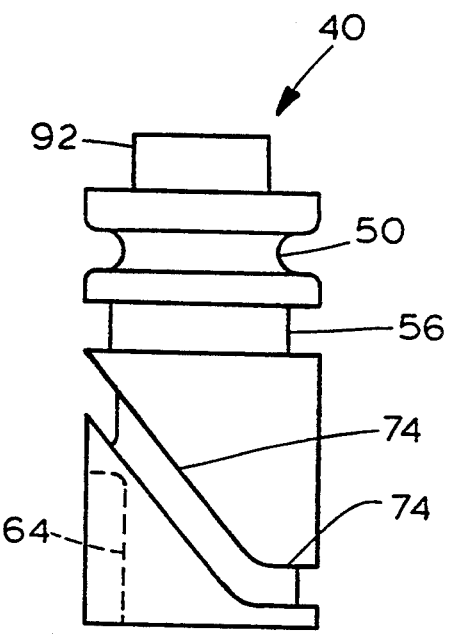
FIGS. 3B and 3C are elevational views of the valve element.
Figure 3C:
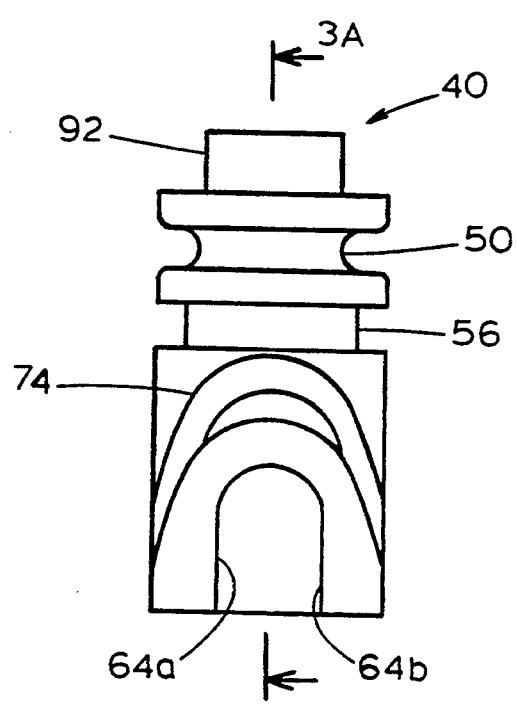

The lower portion of the valve element 40 has a hollow portion 60 formed in the interior of a circumferential side wall 62 of the valve element 40. The hollow interior portion 60 of the valve element 40 comprises part of the main flow channel 18. As shown most clearly in FIG. 3C, the side wall 62 of the valve element 40 has an inverted U-shaped aperture or slot 64. The valve element 40 may be rotated so that the slot 64 is aligned with a circular bore 66, formed in a wall of the valve housing 12, which is in fluid communication with the fluid outlet 16. A second circular bore 70 is formed in the opposite side of the valve housing 12 as the bore 66. The bore 70 is in fluid communication with the fluid inlet 14.

The valve element 40 has a diagonal recess 74 formed therein and an O-ring 76 provided within the recess 74. When the valve element 40 is rotated to its closed position (the position in which the slot 64 is on the opposite side of the housing 12 as the bore 66, which is 180° from the position shown in FIG. 1), the O-ring 76 prevents fluid leakage frown the main flow channel 18 to the fluid outlet 16 via the bore 66.

A check valve 80 for preventing liquid backflow from the fluid outlet 16 to the fluid inlet 14 when the pressure at the fluid inlet 14 is less than atmospheric pressure is provided directly below the valve element 40. The check valve 80 comprises a chamber 82 formed by a portion 84 of the valve housing 12 and a movable ball 86 provided in the chamber 82. A circular bore 88 is formed in the housing portion 84 to connect the interior of the chamber 82 with the atmosphere outside of the valve 10. An O-ring 90 is provided between the ball 86 and the circular bore 88 to prevent fluid leakage through the bore 88.

Figure 2A:
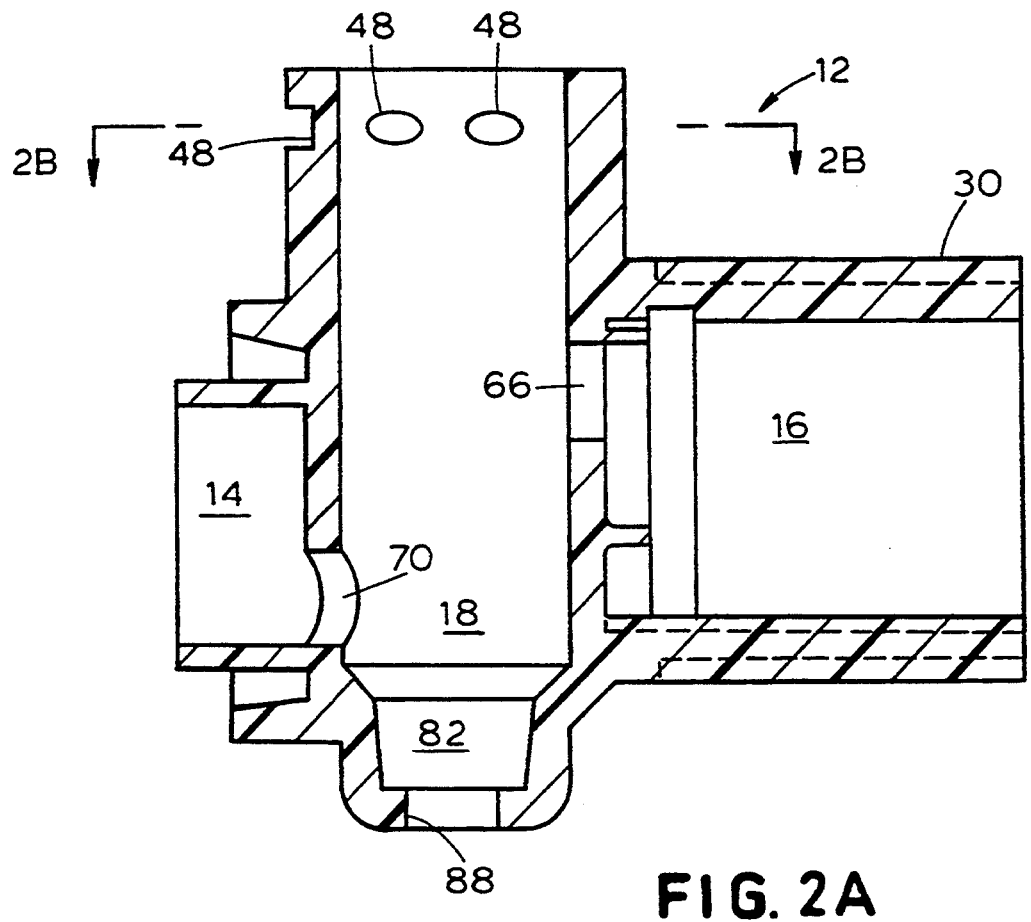
FIG. 2A is a cross-sectional view of the housing of the valve shown in FIG. 1.
Figure 2B:
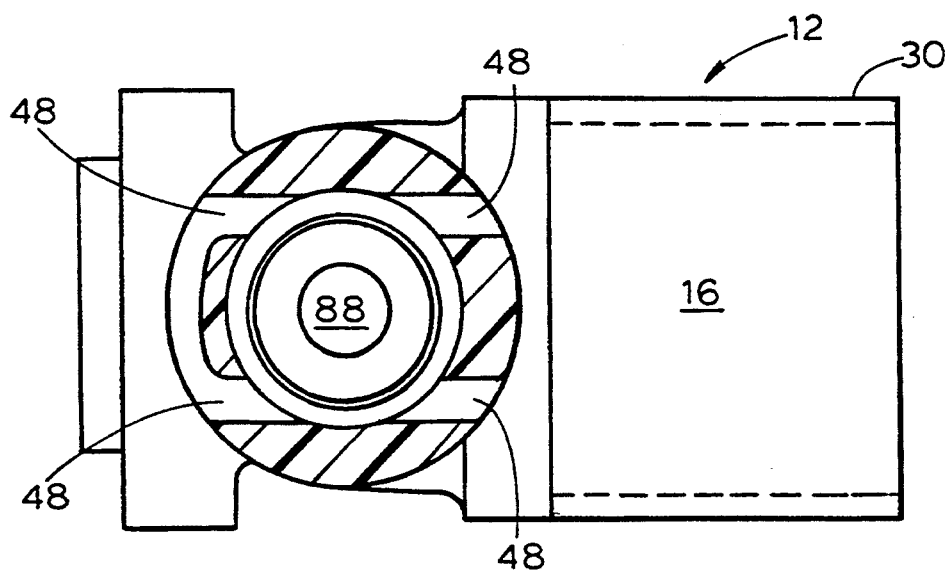
FIG. 2B is a cross-sectional view of a portion of the valve housing.

The valve housing 12 is shown in more detail in FIGS. 2A and 2B. In particular, FIG. 2B illustrates the U-shaped recess 48 in which the U-shaped locking pin 46 is provided.

Figure 3D:
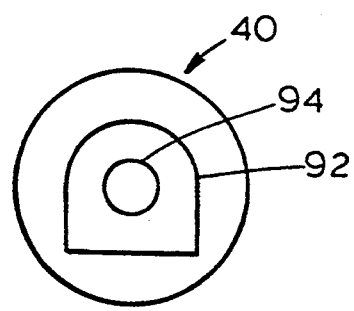
FIG. 3D is a top view of the valve element.

FIGS. 3A-3D illustrate the valve element 40 in more detail. In FIG. 3D, the top of the valve element 40 is shown to have an inverted U-shaped portion 92 having a bore 94 into which the screw 44 (FIG. 1) is threaded. The non-circular portion 92, when disposed in a similarly shaped portion formed in the underside of the knob 42, prevents the position of the knob 42 from slipping with respect to that of the valve element 40.

In operation, the valve 10 may be connected between a source of fresh water, such as a garden hose, and a device which utilizes water, such as a pressure washer for supplying water at relatively high pressures. The valve element 40 may be rotated between an open position, which is shown in FIG. 1, and a closed position 180° from the open position. Referring to FIG. 1, when the valve element 40 is in the open position, fluid flows from the fluid inlet 14, through the bore 70, through the main flow channel 18 (including the interior 60 of the valve element 40 and the slot 64), through the bore 66 and to the fluid outlet 16, as indicated by the arrow 100.

As long as the fluid pressure at the inlet 14 is greater than atmospheric pressure, the ball 86 will be forced against the O-ring 90, and no fluid will leak from the interior of the valve 10 to the atmosphere via the bore 88. If the pressure at the fluid inlet 14 becomes less than atmospheric pressure, the ball 86 will be sucked to a position adjacent the bore 70, substantially blocking the bore 70. As soon as the ball 86 unseats from the O-ring 90 at the beginning of such a pressure decrease, air from the atmosphere will be drawn into the valve 10 via the bore 88 and will be drawn towards the fluid inlet 14. The relative ease with which air flows from the bore 88 to the fluid inlet 14 (due to its low density as compared with liquids) will prevent any liquid at the fluid outlet 16 from backflowing to the fluid inlet 14. When the ball 86 arrives at its position adjacent the bore 70, a small amount of air flow from the bore 88 may continue if the ball 86 does not form a fluid-tight seal against the bore 70. The seal between the ball 86 and the bore 70 may be designed so that it is completely fluid-tight, such as by providing an O-ring (not shown) around the bore 70. The fact that air is drawn to the fluid inlet 14 instead of liquid from the fluid outlet 16 is advantageous in that no contamination of the fresh water at the fluid inlet 14 may occur due to backflow of contaminated water downstream of the valve 10.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A valve comprising:
    a valve housing having a fluid inlet, a main flow channel, and a fluid outlet formed therein;
    a valve element operatively coupled to said valve housing, said valve element movable between an open position in which a fluid flow path exists between said fluid inlet and said fluid outlet along said main flow channel and a closed position in which no fluid flow path exists between said fluid inlet and said fluid outlet;
    a chamber formed in said valve housing offset from said main flow channel, said chamber having an opening in fluid communication with the atmosphere; and
    a ball provided in said chamber, said ball being movable between a first position in which said ball prevents liquid backflow from said fluid outlet to said fluid inlet, said ball substantially blocking said main flow channel when said ball is in said first position, and a second position in which said ball substantially blocks said opening in said chamber, said ball not substantially impeding the flow through said main flow channel when said ball is in said second position.

2. A valve as defined in claim 1 wherein said valve element is rotatable between said open position and said closed position.

3. A valve as defined in claim 1 wherein said valve element is cylindrical in shape.

4. A valve as defined in claim 3 wherein said valve element has a hollow interior portion enclosed by a circumferential side wall.

5. A valve as defined in claim 4 wherein said circumferential side wall has a slot formed therein, said slot being aligned with said fluid outlet when said valve element is in said open position.

6. A valve as defined in claim 1 wherein said valve housing has a circular bore formed therein, said circular bore being in fluid communication with said fluid inlet, said ball being adjacent said circular bore when said ball occupies said first position.

7. A valve as defined in claim 1 wherein said opening comprises a circular bore.

8. A valve comprising:
a valve housing having a fluid inlet, a main flow channel, and a fluid outlet formed therein;
a valve element operatively coupled to said valve housing, said valve element movable between an open position in which a fluid flow path exists between said fluid inlet and said fluid outlet along said main flow channel and a closed position in which no fluid flow path exists between said fluid inlet and said fluid outlet;
a chamber formed in said valve housing offset from said main flow channel, said chamber having an opening in fluid communication with the atmosphere;
a ball provided in said chamber, said ball being movable between a first position in which said ball prevents liquid backflow from said fluid outlet to said fluid inlet and a second position in which said ball substantially blocks said opening in said chamber; and
locking means for rotatably fixing said valve element with respect to said valve housing.

9. A valve as defined in claim 8 wherein said locking means comprises a pin.

10. A valve as defined in claim 1 additionally comprising means for manually actuating said valve element.

11. A valve as defined in claim 10 wherein said actuating means comprises a knob fixed to said valve element.

12. A valve comprising:
a valve housing having a fluid inlet, a main flow channel, and a fluid outlet formed therein;
a valve element operatively coupled to said valve housing, said valve element movable between an open position in which a fluid flow path exists between said fluid inlet and said fluid outlet along said main flow channel and a closed position in which no fluid flow path exists between said fluid inlet and said fluid outlet; and
check valve means for preventing liquid backflow from said fluid outlet to said fluid inlet when said valve element is in said open position, said check valve means being movable between a first position offset from said main flow channel in which said check valve means does not substantially impede the flow through said main flow channel when said valve element is in said open position and a second position in which said check valve substantially blocks said main flow channel.

13. A valve as defined in claim 12 wherein said valve element is rotatable between said open position and said closed position.

14. A valve as defined in claim 12 wherein said valve element is cylindrical in shape.

15. A valve as defined in claim 14 wherein said valve element has a hollow interior portion enclosed by a circumferential side wall.

16. A valve as defined in claim 15 wherein said circumferential side wall has a slot formed therein, said slot being aligned with said fluid outlet when said valve element is in said open position.

17. A valve comprising:
a valve housing having a fluid inlet, a main flow channel, and a fluid outlet formed therein;
a valve element operatively coupled to said valve housing, said valve element movable between an open position in which a fluid flow path exists between said fluid inlet and said fluid outlet along said main flow channel and a closed position in which no fluid flow path exists between said fluid inlet and said fluid outlet;
check valve means for preventing liquid backflow from said fluid outlet to said fluid inlet when said valve element is in said open position, said check valve means being provided at a position offset from said main flow channel so that said check valve means does not substantially impede the flow through said main flow channel when said valve element is in said open position; and
locking means for rotatably fixing said valve element with respect to said valve housing.

18. A valve as defined in claim 17 wherein said locking means comprises a pin.

19. A valve as defined in claim 12 additionally comprising means for manually actuating said valve element.

20. A valve as defined in claim 12 wherein said check valve means comprises means for preventing backflow when the pressure at said fluid inlet becomes less than atmospheric pressure.

* * * * *